United States Patent
Ono

(10) Patent No.: US 11,388,304 B2
(45) Date of Patent: Jul. 12, 2022

(54) INFORMATION PROCESSING APPARATUS AND METHOD OF NOTIFYING VERIFICATION RESULT OF PROGRAM

(71) Applicant: CANON KABUSHIKI KAISHA, Tokyo (JP)

(72) Inventor: Shinichi Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/164,031

(22) Filed: Feb. 1, 2021

(65) Prior Publication Data

US 2021/0160394 A1 May 27, 2021

Related U.S. Application Data

(63) Continuation of application No. 16/693,018, filed on Nov. 22, 2019, now Pat. No. 10,931,846.

(30) Foreign Application Priority Data

Nov. 30, 2018 (JP) .............................. JP2018-225480

(51) Int. Cl.
*H04N 1/00* (2006.01)
*G06F 21/57* (2013.01)

(52) U.S. Cl.
CPC ....... *H04N 1/00899* (2013.01); *G06F 21/575* (2013.01); *H04N 1/00891* (2013.01)

(58) Field of Classification Search
None
See application file for complete search history.

(56) References Cited

U.S. PATENT DOCUMENTS

| | | | | |
|---|---|---|---|---|
| 2007/0180223 A1* | 8/2007 | Tanaka | .................. | G06F 9/4405 713/2 |
| 2010/0332797 A1* | 12/2010 | Matsui | .................. | G06F 1/3203 712/35 |
| 2011/0170686 A1* | 7/2011 | Goto | ...................... | H04L 9/0844 380/44 |
| 2014/0040636 A1* | 2/2014 | Jeansonne | ............. | G06F 21/575 713/189 |
| 2014/0115314 A1* | 4/2014 | Huang | .................. | G06F 9/4401 713/2 |
| 2016/0292422 A1* | 10/2016 | Hayashi | ................. | G06F 21/575 |
| 2017/0249483 A1* | 8/2017 | Kawazu | ................. | G06F 21/64 |
| 2018/0075242 A1* | 3/2018 | Khatri | .................... | H04L 9/3263 |
| 2018/0137285 A1* | 5/2018 | Yamada | ................ | G06F 12/023 |
| 2018/0349608 A1* | 12/2018 | de Cesare | ............. | G06F 9/4406 |
| 2019/0179580 A1* | 6/2019 | Lockwood | ........... | H04N 1/0005 |
| 2019/0325138 A1* | 10/2019 | Ishikawa | ............... | G06F 21/572 |
| 2020/0074075 A1* | 3/2020 | Yasukawa | ............... | G06F 21/51 |
| 2020/0097647 A1* | 3/2020 | Tsuchitoi | .............. | H04L 9/3247 |
| 2020/0110616 A1* | 4/2020 | Ito | ....................... | G06F 11/0751 |

* cited by examiner

*Primary Examiner* — Henok Shiferaw
(74) *Attorney, Agent, or Firm* — Canon U.S.A., Inc. IP Division

(57) ABSTRACT

An information processing apparatus includes a control unit, a storage unit configured to store a program to be executed by the control unit, a verification unit configured to read the program from the storage unit and to verify the read program, and a light-emitting unit configured to be changed to a predetermined light-emitting state or to be changed from the predetermined light-emitting state based on a result of the verification of the program by the verification unit.

18 Claims, 7 Drawing Sheets

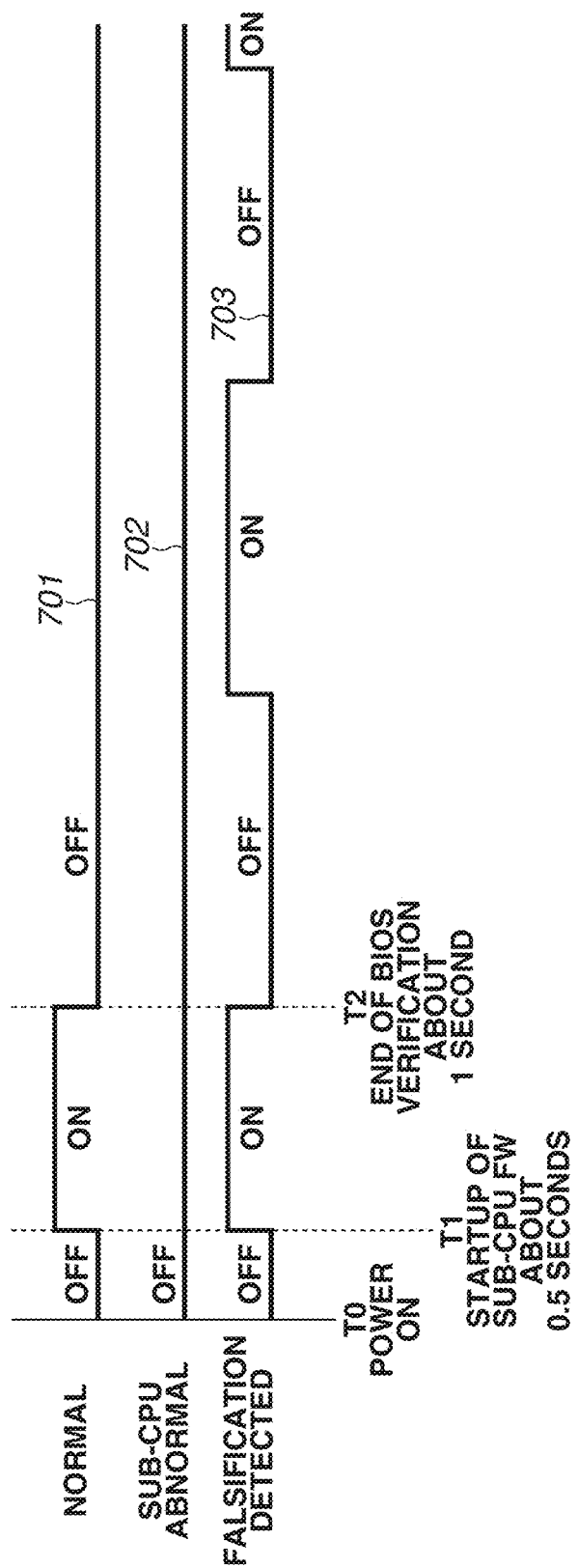

INFORMATION PROCESSING APPARATUS AND METHOD OF NOTIFYING VERIFICATION RESULT OF PROGRAM

CROSS-REFERENCE TO RELATED APPLICATIONS

This application is a Continuation of U.S. patent application Ser. No. 16/693,018, filed Nov. 22, 2019, which claims the benefit of Japanese Patent Application No. 2018-225480, filed Nov. 30, 2018, both of which are hereby incorporated by reference herein in their entirety.

BACKGROUND

Field of the Disclosure

The present disclosure relates to an information processing apparatus and the like that verifies a program that a control unit executes.

Description of the Related Art

As a method of detecting falsification of a boot code in an image forming apparatus (hereinafter, referred to as multifunctional peripheral (MFP)), there is a method in which a sub-central processing unit (CPU) loads a boot code to be executed by a main CPU before startup of the main CPU, and verifies whether the loaded boot code has not been falsified. As processing performed in a case where the sub-CPU detects falsification of the boot code, a method in which the sub-CPU controls a reset signal that is input to the main CPU in order to prevent startup of the main CPU, to maintain a reset state of the main CPU, is conceivable.

Japanese Unexamined Patent Application Publication (Translation of PCT Application) No. 2011-511331 discusses the technique of determining whether a first component has been falsified, and when the first component has not been falsified, booting of the first component is started to update state information so as to indicate success of the booting, whereas when the first component has been falsified, booting of the first component is prevented.

SUMMARY

It is important to notify that the sub-CPU which detects falsification of the boot code is normally operating because whether the sub-CPU is normally operating relates to reliability of a system. An apparatus configured to continuously consume power in order to constantly notify the normal operation of the sub-CPU, however, leads to increase of power consumption.

According to embodiments of the present disclosure, an information processing apparatus includes a control unit, a storage unit configured to store a program to be executed by the control unit, a verification unit configured to read the program from the storage unit and to verify the read program, and a light-emitting unit configured to be changed to a predetermined light-emitting state or to be changed from the predetermined light-emitting state based on a result of the verification of the program by the verification unit.

Further features of the present disclosure will become apparent from the following description of exemplary embodiments with reference to the attached drawings.

BRIEF DESCRIPTION OF THE DRAWINGS

FIG. 7 is a diagram illustrating lighting timing of a light-emitting diode (LED).

DESCRIPTION OF THE EMBODIMENTS

A first exemplary embodiment of the present disclosure is described below with reference to drawings.

A multifunctional peripheral (MFP) is described as an example of an information processing apparatus that executes a failure detection method when validity of a boot code (boot program) of a main central processing unit (CPU) 101 is verified (when processing to detect falsification of boot code is performed). The MFP is an image forming apparatus (printing apparatus) including an image forming function (print function). Unless otherwise noted, the present disclosure is applicable to a single apparatus as well as a system including a plurality of apparatuses as long as functions according to the present exemplary embodiment are executed.

Figure 1:
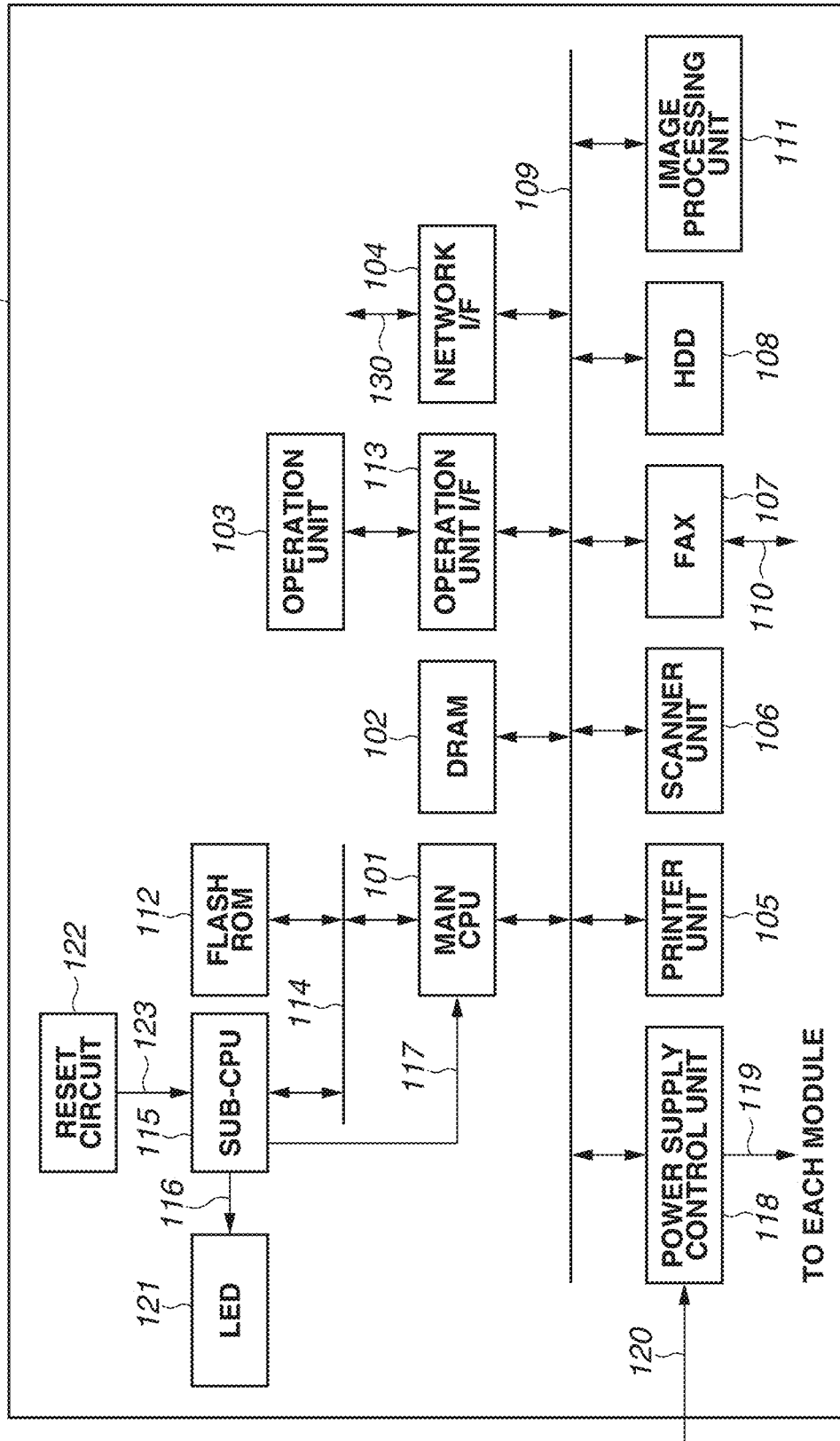
FIG. 1 is a diagram illustrating a configuration of a multifunctional peripheral (MFP).

FIG. 1 is a diagram illustrating a configuration of an MFP 1. In FIG. 1, the main CPU 101 serves as a first control unit that controls the whole of the MFP 101.

A dynamic random access memory (DRAM) 102 is a volatile memory, and stores programs to be executed by the main CPU 101 and functions as a work area of temporary data.

An operation unit 103 includes a touch screen, and notifies the main CPU 101 of operation performed by a user through an operation unit interface (I/F) 113.

A network I/F 104 is connected to a local area network (LAN) 130 to communicate with an external apparatus.

A printer unit 105 prints image data on a sheet. The printer unit 105 may be of any type. For example, it may be of an electrophotographic type or an inkjet type. A scanner unit 106 optically reads an image on a sheet, and converts the read image into an electric signal, thereby generating a scanned image. A facsimile (FAX) 107 is connected to a public line 110 to perform facsimile communication with an external apparatus. The main CPU 101 executes various kinds of programs including a main CPU basic input/output system (BIOS) 401 described below, to control a print function, a read function, and a FAX function respectively provided by the printer unit 105, the scanner unit 106, and the FAX 107.

A hard disk drive (HDD) 108 is a nonvolatile storage device, and stores programs to be executed by the main CPU 101, such as an operating system (OS). Further, the HDD 108 is used as a spool area for a print job, a scan job, etc. The HDD 108 is also used as an area that stores the scanned image for reuse.

A bus 109 is a signal bus that connects the modules to one another to carry out communication. The public line 110 connects the FAX 107 and the external apparatus to each other. An image processing unit 111 is an application specific integrated circuit (ASIC). The image processing unit 111 converts a print job received by the network OF 104 into an image suitable for printing by the printer unit 105, and performs processing such as noise reduction, color space conversion, rotation, and compression on the scanned image read by the scanner unit 106. Further, the image processing unit 111 performs image processing of the scanned image stored in the HDD 108.

A flash read-only memory (ROM) 112 is a nonvolatile memory, and stores a program including BIOS that is a boot code to be executed by the main CPU 101. Further, the flash ROM 112 stores default setting values of the MFP 1.

The operation unit I/F 113 connects the operation unit 103 and the signal bus 109 to each other.

A serial peripheral interface (SPI) bus 114 connects the main CPU 101, the flash ROM 112, and a sub-CPU 115 to one another. In the present exemplary embodiment, the main CPU 101 and the sub-CPU 115 each act as a master device of the flash ROM 112.

The sub-CPU 115 serves as a second control unit that loads the boot code (BIOS) of the main CPU 101 from the flash ROM 112 and verifies whether the boot code has not been falsified, at the time of starting up the MFP 1. In other words, the sub-CPU 115 verifies validity of the BIOS. In a case where it is determined that the BIOS has not been falsified (BIOS is valid), the sub-CPU 115 cancels a reset state of the main CPU 101.

As an example of a method of detecting falsification of data, the present exemplary embodiment adopts the following method. For example, data to be verified, a digital signature of the data (hash value of original data encrypted with private key), and a public key of the digital signature (public key in pairs with private key) are stored in one or a plurality of memories. Then, a hash value is calculated from the data to be verified, and the digital signature is decrypted with the public key to obtain the hash value of the original data. The sub-CPU 115 compares the two hash values. When the two hash values are coincident with each other, the sub-CPU 115 determines that the data to be verified is valid and has not been falsified. When the two hash values are different from each other, the sub-CPU 115 determines that the data to be verified is not valid and has been falsified. Examples of the public key encryption method includes RSA-2048 and elliptic curve digital signature algorithm (ECDSA). The method of detecting falsification, however, is not limited to this method. The data to be verified (e.g., BIOS 401), the digital signature thereof (e.g., BIOS signature 402), and the public key to decrypt the digital signature (e.g., public key for BIOS signature 402) may be stored in the same memory (e.g., flash ROM 112). Further, the data to be verified (e.g., firmware (FW) 404) and the digital signature thereof (e.g., FW signature 405) may be stored in the same memory (e.g., flash ROM 112), and the public key to decrypt the digital signature may be stored in another memory (e.g., one-time programmable (OTP) memory 304).

A signal 116 is a control signal to turn on or off a light-emitting diode (LED) 121, and is provided from a general purpose input/output (GPIO) port of the sub-CPU 115 to the LED 121. The sub-CPU 115 outputs a signal 116 of a high (Hi) level or a low (Lo) level from a GPIO 303 through software control, thereby turning on or off the LED 121 at any timing.

A signal 117 is a reset signal, and is provided from another GPIO port 312 of the sub-CPU 115 to a reset terminal of the main CPU 101. The reset state of the main CPU 101 is canceled by the reset signal 117. When the reset signal 117 is shifted from the "Lo" level to the "Hi" level by GPIO port 312, the reset state of the main CPU 101 is canceled.

A power supply control unit 118 is an integrated circuit and controls power supply to each of the modules inside the MFP 1. A power line 119 supplies power to each of the modules from the power supply control unit 118. A power supply line 120 is supplied with a commercial alternating-current (AC) power. The LED 121 is a means that enables a person such as a user and a service engineer to recognize a current state of the apparatus, and is a light-emitting device driven by the LED signal 116 output from the sub-CPU 115. In other words, the LED 121 takes two power states (first power state and a second power state), namely, a lighting state (corresponding to on state) and an non-lighting state (corresponding to off state), and the LED 121 in the lighting state and the LED 121 in the non-lighting state are visually distinguishable by the person.

When a power source of the system is turned on, a reset circuit 122 first resets the modules including the sub-CPU 115 and the main CPU 101. After a predetermined delay time has elapsed after the voltage of the power supply reaches a prescribed voltage, the reset circuit 112 shifts a reset signal 123 for the sub-CPU 115 from the "Lo" level to the "Hi" level. The signal 123 is a sub-CPU reset signal, and is provided from the reset circuit 122 to a reset terminal of the sub-CPU 115. When the sub-CPU reset signal 123 is shifted to the "Hi" level, the reset state of the sub-CPU 115 is canceled, and the sub-CPU 115 performs processing illustrated in a flowchart of FIG. 5 described below.

Figure 2:
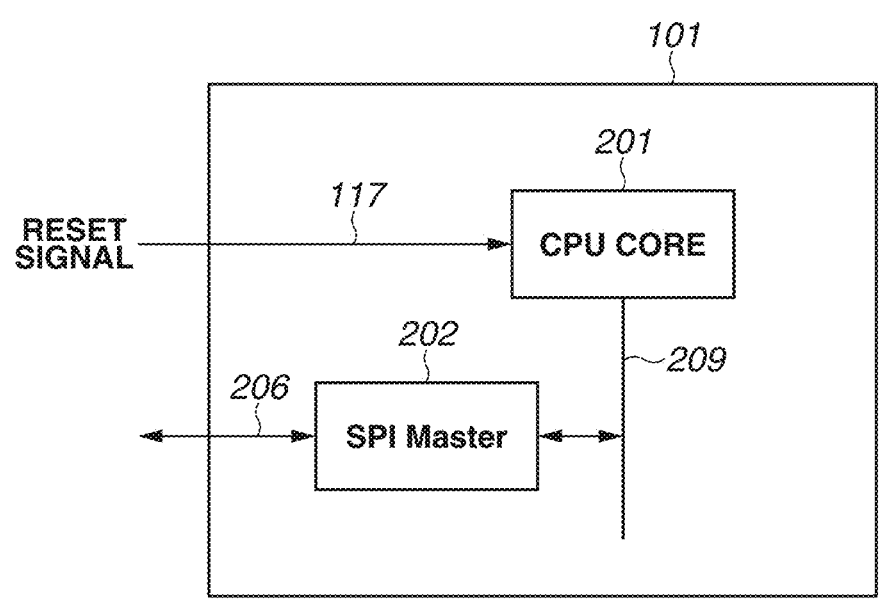
FIG. 2 is a diagram illustrating a configuration of a main central processing unit (CPU).

FIG. 2 is a diagram illustrating a configuration of the main CPU 101. In FIG. 2, a CPU core 201 provides a basic function of the CPU. An SPI Master 202 is connected as an SPI master device to an external SPI device (flash ROM 112), and reads and writes data. An SPI bus 206 (114) electrically connects the SPI Master 202 to the external SPI device. The SPI Master 202 is used when the main CPU 101 reads data from the flash ROM 112. A signal bus 209 connects the modules of the main CPU 101 to one another. When the reset signal 117 is at the "Lo" level, the main CPU 101 (CPU core 201) is in the reset state. When the reset signal 117 is at the "Hi" level, the main CPU 101 (CPU core 201) is in a reset-canceled state. When the reset signal 117 is shifted from the "Lo" level (reset state) to the "Hi" level (reset-canceled state), the CPU core 201 first loads the BIOS 401 of the main CPU 101 stored in the flash ROM 112 to the DRAM 102, and executes the BIOS 401.

Figure 3:
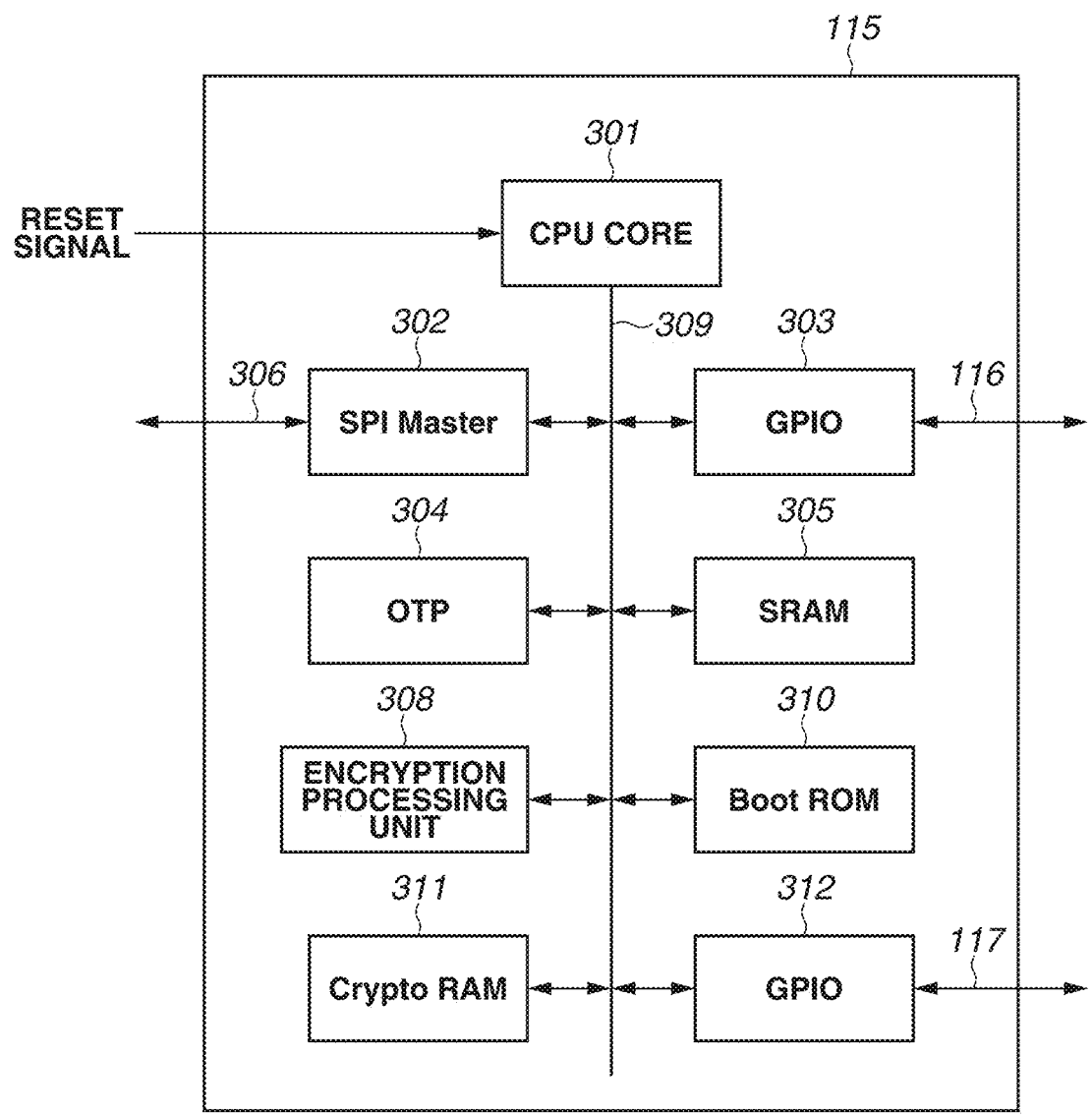
FIG. 3 is a diagram illustrating a configuration of a sub-CPU.

FIG. 3 is a diagram illustrating a configuration of the sub-CPU 115. In FIG. 3, a CPU core 301 provides a basic function of the CPU. An SPI Master 302 is connected as an SPI master device to the external SPI device (flash ROM 112) through an SPI bus 306 (114), and reads and writes data. The SPI Master 302 is used when the CPU core 301 reads data from the flash ROM 112. The GPIO 303 outputs the LED signal 116 to the external device (LED 121). The GPIO 312 outputs the reset signal 117 to control cancelation of the reset state of the main CPU 101, to the main CPU 101.

A public key to decrypt the digital signature of a FW of the sub-CPU 115 is written into the OTP memory 304 when the memory 304 is manufactured. Further, an address on the flash ROM 112 where Tag (information representing storage address of firmware of sub-CPU 115) is stored is written into the OTP memory 304. The data written into the OTP memory 304 is unrewritable after being written once and is secured.

A static random access memory (SRAM) 305 is used as a work memory inside the sub-CPU 115. An encryption processing unit 308 is a hardware circuit, and decrypts a digital signature (e.g., digital signature of firmware of sub-CPU 115 and digital signature of BIOS 401 of main CPU 101) using a public key. A signal bus 309 is connected to each of the modules inside the sub-CPU 115. A Boot ROM 310 is a mask ROM, and stores a boot code of the sub-CPU 115. The contents in the Boot ROM 310 is unrewritable and secured.

In a case where the reset signal input to the sub-CPU 115 is at the "Lo" level, the sub-CPU 115 (CPU core 301) is in the reset state. In a case where the reset signal is at the "Hi" level, the sub-CPU 115 (CPU core 301) is in the reset-canceled state. When the reset signal is shifted from the reset state to the reset-canceled state, the CPU core 301 first loads the own boot code from the Boot ROM 310 and executes the boot code.

A Crypto RAM 311 is a volatile memory storing data under high confidentiality used by the encryption processing unit 308, etc.

Figure 4:
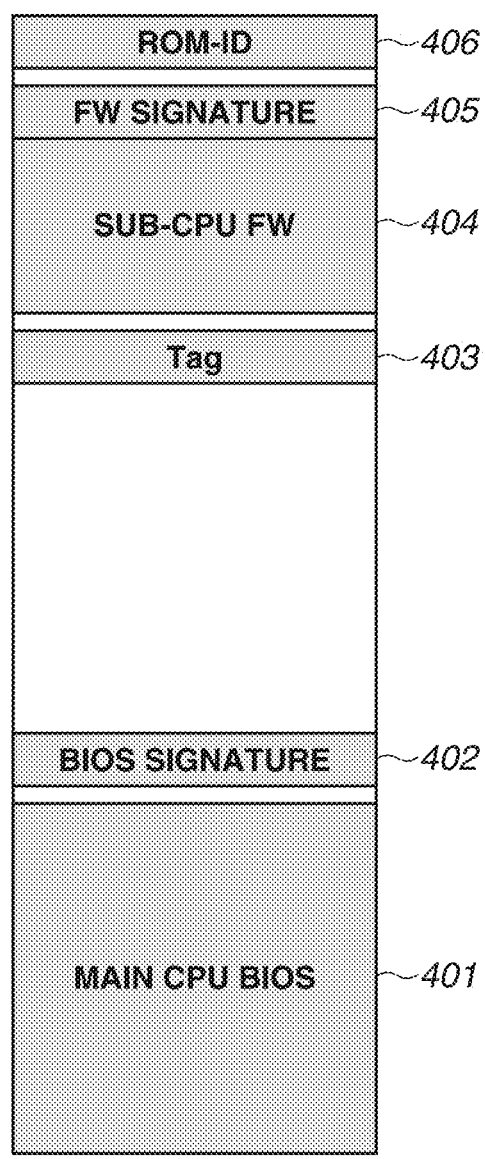
FIG. 4 is a diagram illustrating a memory map of a flash read only memory (ROM).

FIG. 4 is a diagram illustrating a memory map of the flash ROM 112. The flash ROM 112 stores the main CPU BIOS 401, the BIOS signature 402 as the digital signature of the BIOS 401, the sub-CPU FW 404, and the FW signature 405 as the digital signature of the sub-CPU FW 404. The main CPU BIOS 401 is a boot code of the main CPU 101. The BIOS signature 402 is an RSA signature value corresponding to the hash value of the BIOS 401. The sub-CPU FW 404 includes a boot code of the sub-CPU 115 and a public key to decrypt the BIOS signature 402. The FW signature 405 is an ECDSA signature value of the sub-CPU FW 404. Alternatively, the FW signature 405 may be an ECDSA signature value at a specific portion of a head part of the sub-CPU FW 404.

The flash ROM 112 further stores a Tag 403 representing a head address of a memory area storing the sub-CPU FW 404. The address of the Tag 403 itself is stored in the OTP memory 304.

The flash ROM 112 further stores information referred to as ROM-ID. A head address of the main CPU BIOS 401, a size, and an address of the BIOS signature 402 are stored in the ROM-ID 406.

In the present exemplary embodiment, an example is illustrated in which only one set of the main CPU BIOS 401, the BIOS signature 402, the Tag 403, the sub-CPU FW 404, and the FW signature 405 is stored. Alternatively, a plurality of sets may be stored and switched to each other and used as necessary.

Next, a procedure of processing by the sub-CPU 115 according to the present exemplary embodiment is described with reference to a flowchart of FIG. 5. The flowchart is started by the sub-CPU 115 reset of which has been canceled.

Processing in steps S501 to S504 described below corresponds to processing to verify the FW 404 of the sub-CPU 115 (processing to detect falsification of FW 404).

In step S501, the sub-CPU 115 (CPU core 301) executes the boot code of the sub-CPU 115 inside the Boot ROM 310. Then, the sub-CPU 115 loads the sub-CPU FW 404 from the flash ROM 112 to the SRAM 305 through the SPI bus 114 based on the boot code.

In step S502, the sub-CPU 115 (CPU core 301) uses the encryption processing unit 308 to decrypt the FW signature 405 stored in the flash ROM 112 with the public key inside the OTP memory 304 to obtain a correct hash value.

In step S503, the sub-CPU 115 (CPU core 301) uses the encryption processing unit 308 to calculate the hash value of the sub-CPU FW 404 loaded in the SRAM 305.

In step S504, the sub-CPU 115 (CPU core 301) compares the hash value obtained in step S502 with the hash value calculated in step S503, to determine whether the both hash values are equal to each other. In a case where the both hash values are not equal to (not coincident with) each other (NO in step S504), the processing ends. In the case where the processing ends here, the LED 121 is not turned on at all in the present exemplary embodiment. Accordingly, the person (user or service engineer) monitoring the state of the LED 121 after the MFP 1 is turned on can recognize possibility of sub-CPU 115 failure or abnormality (e.g., falsification) of the FW 404 of the sub-CPU 115.

In a case where the both hash values are equal to (coincident with) each other (YES in step S504), the sub-CPU 115 (CPU core 301) loads the sub-CPU FW 404 from the flash ROM 112 to the SRAM 305 in step S505. In step S506, the sub-CPU 115 (CPU core 301) executes the sub-CPU FW 404 loaded to the SRAM 305, and controls the GPIO 303 based on the FW 404 to drive the LED signal 116, thereby turning on the LED 121. The lighting of the LED 121 is maintained by the LED signal 116 from the GPIO 303 while validity of the main CPU BIOS 401 is being verified as described below. The processing in step S505 may be omitted, and the FW 404 loaded to the SRAM 305 may be executed in step S501.

The FW 404 of the sub-CPU 115 is executed and the LED 121 is turned on in the above-described manner Therefore, lighting of the LED 121 can notify the user that the FW 404 of the sub-CPU 115 and the sub-CPU 115 itself have no abnormality. In contrast, non-lighting of the LED 121 can notify the user that the FW 404 of the sub-CPU 115 may have abnormality (falsification) or the sub-CPU 115 itself may be in failure.

In step S507, the sub-CPU 115 (CPU core 301) loads a ROM-ID 406 from the flash ROM 112 to the Crypto RAM 311.

IN step S508, the sub-CPU 115 (CPU core 301) obtains the address of the main CPU BIOS 401 and the address of the BIOS signature 402 from the ROM-ID 406 loaded to the Crypto RAM 311.

Processing in steps S509 to S513 described below corresponds to processing to verify the BIOS 401 of the main CPU 101 (processing to detect falsification of BIOS 401).

In step S509, the sub-CPU 115 (CPU core 301) loads the BIOS signature 402 to the SRAM 305.

In step S510, the sub-CPU 115 (CPU core 301) uses the encryption processing unit 308 to decrypt the BIOS signature 402 with the public key included in the sub-CPU FW 404, thereby obtaining a hash value.

In step S511, the sub-CPU 115 (CPU core 301) loads the main CPU BIOS 401 from the flash ROM 112 to the SRAM 305.

In step S512, the sub-CPU 115 (CPU core 301) uses the encryption processing unit 308 to calculate the hash value of the main CPU BIOS 401 from the main CPU BIOS 401 loaded to the SRAM 305.

In step S513, the sub-CPU 115 (CPU core 301) compares the hash value obtained in step S510 with the hash value calculated in step S512, to determine whether the both hash values are equal to each other. In a case where the both hash values are equal to (coincident with) each other (YES in step S513), the sub-CPU 115 (CPU core 301) controls the signal 116 through the GPIO 303 to turn off the LED 121 in step S514. Although it is more desirable that the LED 121 continue the non-lighting state during a period when the sub-CPU 115 can control the LED 121 through the GPIO 303, the LED 121 is supposed to continue the non-lighting state at least until the sub-CPU 115 cancels the reset state of the main CPC 101. In other words, the LED 121 continues the non-lighting state until the sub-CPU 115 loads the BIOS 401 stored in the flash ROM 112 to make the main CPU 101 operable. Further, in step S515, the sub-CPU 115 (CPU core 301) shifts the reset signal 117 to the "Hi" level through the GPIO 312, and cancels the reset state of the main CPU 101. In this case, the sub-CPU 115 (CPU core 301) continues the non-lighting state of the LED 121 without turning on the LED 121 again after the reset state of the main CPU 101 is canceled.

Thereafter, in step S516, the sub-CPU 115 (CPU core 301) enters a sleep state that requires the lowest power consumption, and maintains the sleep state. The sub-CPU 115 (CPU core 301) maintains output of the signal 116 from the GPIO 303 in the sleep state. In other words, the LED 121 remains in an off state while the reset state of the main CPU 101 is canceled (state in and after step S516). The LED 121 is switched from the lighting state to the non-lighting state in the above-described manner, which makes it possible to reduce the power consumption as compared with a case where the lighting state is maintained. In other words, the non-lighting state of the LED 121 requires only lower power consumption per unit time than the lighting state.

Further, the sub-CPU 115 (CPU core 301) maintains the output of the signal 117 from the GPIO 312 at the "Hi" level in the sleep state. In other words, the main CPU 101 remains in the reset-canceled state.

It is unnecessary for the sub-CPU 115 according to the present exemplary embodiment to return to a normal state after entering the sleep state once. Therefore, the sub-CPU 115 does not need to receive an interrupt signal. If the sub-CPU 115 is used for purposes other than falsification detection, however, the sub-CPU 115 may receive the interrupt signal and return to the normal state.

In contrast, in a case where the both hash values are not equal to (not coincident with) each other (NO in step S513), the sub-CPU 115 (CPU core 301) controls the signal 116 through the GPIO 303 to blink the LED 121 in step S517. Blinking may be performed in a pattern in which the lighting state and the non-lighting state are alternately repeated every second. It is desirable that the LED 121 continue the blinking state during the period when the sub-CPU 115 can control the LED 121 through the GPIO 303. Thus, blinking of the LED 121 can notify the main CPU 101 that abnormality of the BIOS 401 has occurred due to falsification, etc. Further, blinking of the LED can reduce the power consumption as compared with continuous lighting of the LED 121. In other words, the blinking of the LED 121 consumes lower power per unit time than the lighting state. The blinking of the LED consumes higher power per unit time than the non-lighting state.

As described above, the sub-CPU 115 calculates the hash value of the sub-CPU FW 404 loaded from the flash ROM 112 and compares the calculated hash value with the correct hash value, thereby verifying validity of the sub-CPU FW 404 stored in the flash ROM 112. In a case where it is determined by the verification that the sub-CPU FW 404 is valid, the sub-CPU 115 executes the sub-CPU FW 404 loaded from the flash ROM 112, and verifies validity of the main CPU BIOS 401. In other words, the sub-CPU FW 404 is also a verification program to verify validity of the main CPU BIOS 401. The sub-CPU FW 404 includes a program code that starts verification of validity of the main CPU BIOS 401 after turning on the LED 121. The LED 121 is turned on for a time in the above-described manner, which makes it possible to notify that the sub-CPU 115 correctly executes the sub-CPU FW 404.

The sub-CPU 115 loads the main CPU BIOS 401 from the flash ROM 112 based on the verification program, and calculates the hash value and compares the calculated hash value with the correct hash value in a manner similar to the verification of the sub-CPU FW 404. Thus, validity of the main CPU BIOS 401 stored in the flash ROM 112 is verified. After the verification of the main CPU BIOS 401 ends, the sub-CPU 115 turns off the LED 121. Turning off the LED 121 can reduce the power consumption as compared continuous lighting of the LED 121.

More specifically, if it is determined that the main CPU BIOS 401 is valid, the sub-CPU 115 maintains the non-lighting state of the LED 121 during the period when the sub-CPU 115 itself can control the lighting state and the non-lighting state of the LED 121. If it is determined that the main CPU BIOS 401 is not valid, the sub-CPU 115 controls the LED 121 so as to alternately repeat the non-lighting state and the lighting state during the period when the sub-CPU 115 itself can control the lighting state and the non-lighting state of the LED 121. Accordingly, validity/invalidity of the main CPU BIOS 401 can be determined and notified without maintaining the lighting state of the LED 121.

Figure 6:
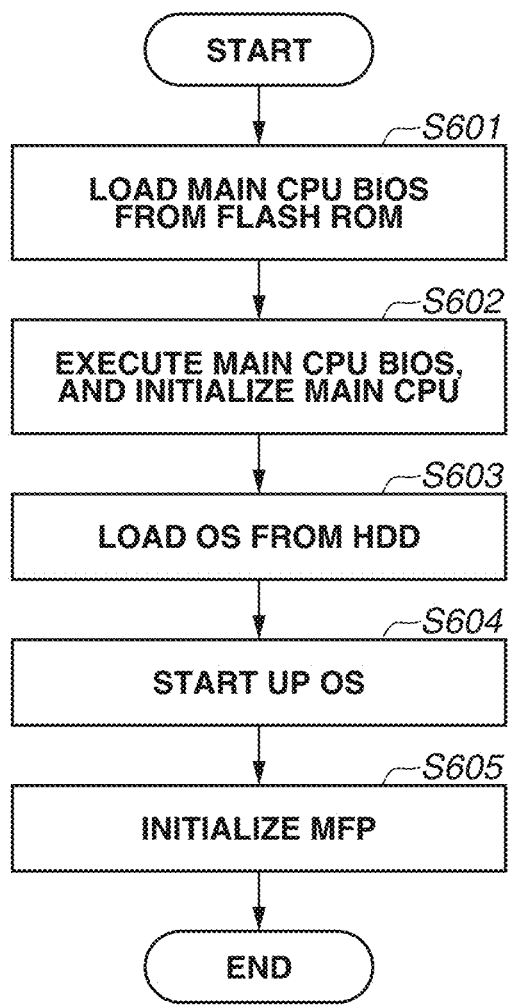
FIG. 6 is a flowchart illustrating processing by the main CPU.

Next, a procedure of processing by the main CPU 101 according to the present exemplary embodiment is described with reference to a flowchart of FIG. 6.

In step S601, the main CPU 101 (CPU core 201) loads the main CPU BIOS 401 stored in the flash ROM 112 to the DRAM 102 immediately after the reset state is canceled.

Then, in step S602, the main CPU 101 (CPU core 201) executes the BIOS 401, and initializes input/output of the main CPU 101 based on the BIOS 401.

In step S603, the main CPU 101 (CPU core 201) loads the OS from the HDD 108 to the DRAM 102.

Further, in step S604, the main CPU 101 (CPU core 201) starts up the OS loaded to the DRAM 102.

Subsequently, in step S605, the main CPU 101 (CPU core 201) initializes the printer unit 105, the scanner unit 106, the FAX 107, the image processing unit 111, the network I/F 104, and the operation unit 103, to make the MFP 1 operable.

Next, lighting timing of the LED 121 according to the present exemplary embodiment is described with reference to a timing chart of FIG. 7. In FIG. 7, a timing chart 701 is a chart in a case where no abnormality has occurred to the FW 404 of the sub-CPU 115 and the CPU 115 itself, and no abnormality has occurred to the BIOS 401 of the main CPU 101 either (normal state). In the timing chart 701, at time T0 (when reset circuit 122 cancels reset state of sub-CPU 115), the LED 121 is turned off (OFF). At time T1 (when processing for detecting falsification of BIOS 401 starts: step S506 in FIG. 5), the FW 404 turns on the LED 121 (ON). At time T2 (when processing for detecting falsification of BIOS 401 ends: step S514 in FIG. 5), the FW 404 turns off the LED 121 (OFF).

A timing chart 702 is a chart in a case where abnormality has occurred to the FW 404 of the sub-CPU 115 or the sub-CPU 115 itself. Also in the timing chart 702, at time T0, the LED 121 is turned off (OFF). Thereafter, the LED 121 is not turned on and remains off (OFF) because the FW 404 of the sub-CPU 115 is not executed.

A timing chart 703 is a chart in a case where abnormality has occurred to the BIOS 401. Also in the timing chart 703, at time T0, the LED 121 is turned off (OFF). In the timing chart 703, the FW 404 is executed, and the LED 121 is accordingly turned on (ON) at time T1. Further, abnormality of the BIOS 401 is detected by the FW 404, and the LED 121 accordingly blinks (repeats ON/OFF) after time T2.

As described above, the MFP 1 according to the present exemplary embodiment continuously lights the LED 121 while validity of the BIOS 401 of the main CPU 101 is being verified by the FW 404 which is executed by the sub-CPU 115. In the case where abnormality of the BIOS 401 caused by falsification, etc. is not detected as a result of the verification, the LED 121 is turned off. As described above, since the LED 121 is not all the time turned on when the BIOS 401 is normal, it is possible to reduce power consumption during operation of the MFP 1. In contrast, in the case where abnormality of the BIOS 401 caused by falsification, etc. is detected as a result of the processing to detect falsification of the BIOS 401, the MFP 1 blinks the LED 121. Thus, the blinking of the LED 121 can notify abnormality of the BIOS 401 (boot code of main CPU 101) caused by falsification, etc. Further, the power consumption of the LED 121 can be reduced in the blinking state as compared with the continuous lighting state.

In the present exemplary embodiment, detection of the falsification is notified to the user by lighting and non-lighting of the LED 121; however, notification can be made other than by the LED, for example, buzzer sound, voice, or a radio signal also can achieve the notification purpose. For example, in a case of the buzzer sound, the buzzer sound is made during the processing for detecting falsification of the BIOS 401, and the buzzer sound is stopped when abnormality such as falsification is not detected. However, the buzzer sound may be intermittently made when abnormality such as falsification is detected.

A second exemplary embodiment is described below. In the first exemplary embodiment, the FW 404 turns on the LED 121. In the MFP 1 according to the present exemplary embodiment, the LED 121 is automatically turned on without using the FW 404 when the reset circuit 122 cancels the reset state of the sub-CPU 115. For example, a switch circuit may be provided between the LED 121 and the power supply, and switching of the switch circuit may be controlled by either the signal 116 from the sub-CPU 115 or the reset signal of the sub-CPU 115 output from the reset circuit 122. In such a circuit configuration, the LED 121 is automatically turned on without through the FW 404 when the reset state of the sub-CPU 115 is canceled, and the FW 404 turns off or blinks the LED 121 based on the result of the processing for detecting falsification of the BIOS 401 by the sub-CPU 115. In other words, as compared with the timing chart in FIG. 7, the LED 121 is in the lighting state also during a period from time T0 to time T1 in the MFP 1 according to the present exemplary embodiment.

Figure 5:
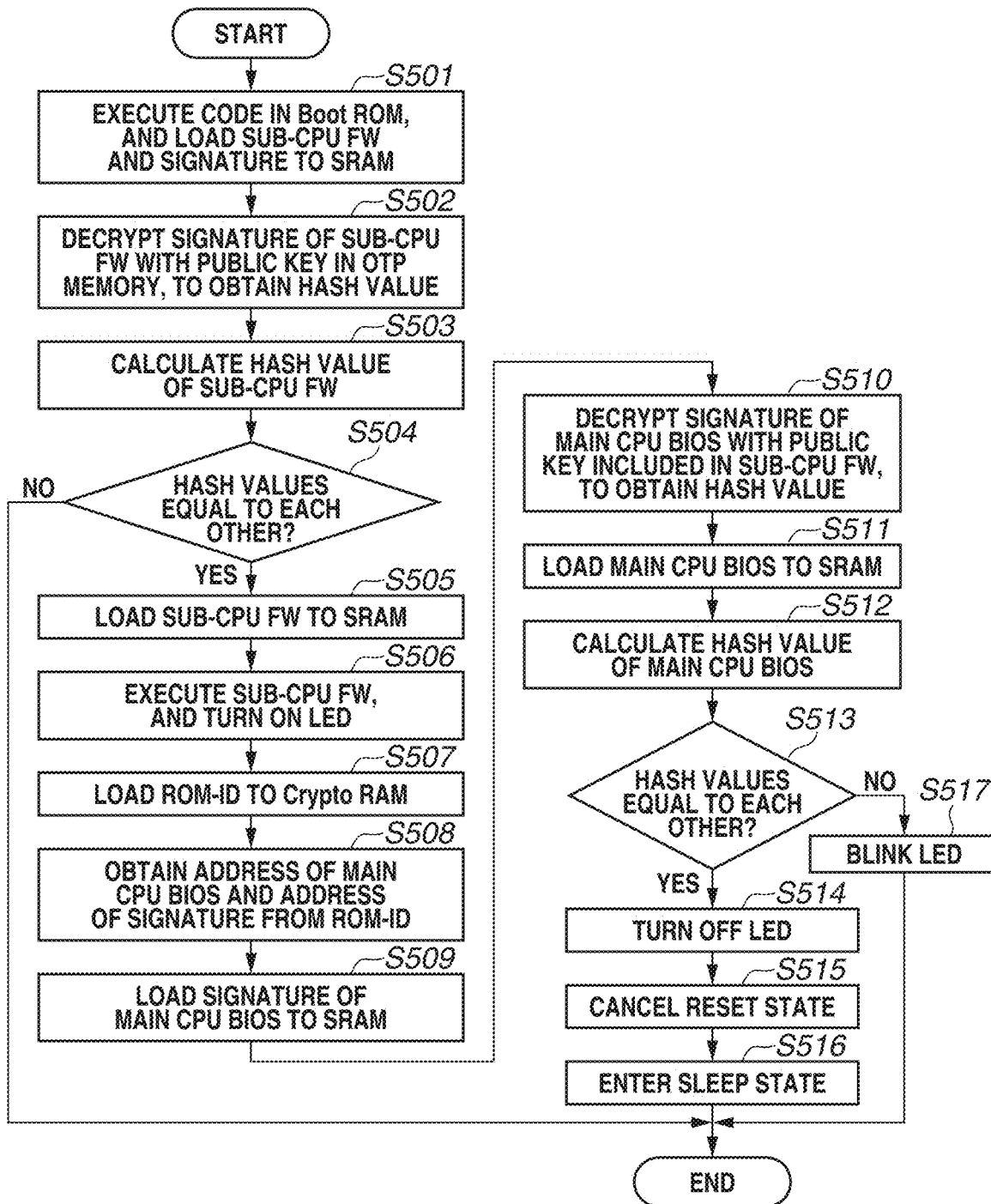
FIG. 5 is a flowchart illustrating processing by the sub-CPU.

In the present exemplary embodiment, the processing for turning on the LED 121 in step S506 of FIG. 5 is omitted because it is unnecessary for the FW 404 to turn on the LED 121 at time T1.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus, comprising:
a memory configured to store a first program and a second program;
a first processor configured to execute the first program stored in the memory;
a second processor configured to perform a verification process for determining whether the second program is valid and for determining whether the first program is valid in a case where the second program is valid; and
a notification device configured to issue a notification in a case where the second program is valid and to change the notification based on whether the first program is valid.

2. The information processing apparatus according to claim 1, wherein the notification device is a LED (light emitting diode).

3. The information processing apparatus according to claim 2, wherein the LED becomes a first lighting state while the second processor is executing the second program.

4. The information processing apparatus according to claim 3, wherein the LED changes from the first lighting state to a non-lighting state in a case the first program stored in the memory is valid.

5. The information processing apparatus according to claim 3, wherein the LED changes from the first lighting state to a second lighting state different from the first lighting state in a case the first program stored in the memory is not valid.

6. The information processing apparatus according to claim 1, wherein the second processor executes the second program and then controls the notification device to notify that the second processor is operating, and
wherein the second program is firmware.

7. The information processing apparatus according to claim 6, wherein the second processor compares a value based on the firmware with a predetermined value and the second processor executes the firmware based on a comparison result of the value based on the firmware with the predetermined value.

8. The information processing apparatus according to claim 7, wherein the value based on the firmware is a hash value of the firmware.

9. The information processing apparatus according to claim 7, wherein the second processor outputs the predetermined value using a signature and a key inside an OTP (one-time programmable) memory.

10. The information processing apparatus according to claim 1, wherein the notification device is configured to notify that the first program stored in the memory is not valid.

11. The information processing apparatus according to claim 1, wherein the notification device does not notify in a case the first program stored in the memory is valid.

12. The information processing apparatus according to claim 1, wherein the second processor cancels a reset state of the first processor in a case the first program stored in the memory is valid, and the first processor canceled from the reset state executes the first program stored in the memory.

13. The information processing apparatus according to claim 1, wherein the information processing apparatus is an apparatus including a print function.

14. The information processing apparatus according to claim 1, wherein the information processing apparatus is an apparatus including a read function.

15. The information processing apparatus according to claim 1, wherein the information processing apparatus is an apparatus including a print function and a read function.

16. The information processing apparatus according to claim 1, wherein the notification device notifies a first notification notifying that the second processor has determined that the second program is valid and then the notification device notifies a second notification notifying the first program is not valid in a case where the first program is not valid.

17. The information processing apparatus according to claim 5, wherein the first lighting state is a state in which the LED is lit, and wherein the second lighting state is a state in which the LED is blinking.

18. A control method of an information processing apparatus having a memory configured to store a first program and a second program, a first processor, and a second processor, the control method comprising:

performing, by the second processor, a verification process for determining whether the second program is valid and for determining whether the first program is valid in a case where the second program is valid;

issuing a notification in a case where the second program is valid and changing the notification based on whether the first program is valid; and executing, by the first processor, the first program determined to be valid in the verification process.

* * * * *